Patented Feb. 24, 1942

2,274,120

UNITED STATES PATENT OFFICE 2,274,120

PROCESS FOR CURING VANILLA BEANS

Arnold K. Balls, Washington, D. C., and Arthur G. Kevorkian and Francisca E. Arana, Mayaguez, P. R.; dedicated to the free use of the People in the territory of the United States No Drawing. Application August 6, 1941, Serial No. 405,590

2 Claims. (Cl. 99—140)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the people in the territory of the United States to take effect on the granting of a patent to us.

Our invention relates to an improvement in the curing of vanilla beans. An object of our invention is to provide a method for curing vanilla beans whereby the appearance and aroma of the beans is enhanced. A softer and less woody feel throughout the bean, especially at the stem end, is produced.

The well known process for curing vanilla beans consists in general of exposing the beans to an elevated temperature; later drying them at room temperature; and finally aging.

The value of cured vanilla beans depends on their appearance and on the flavor and aroma of the extract made therefrom. The aromatic substances in this extract are known to consist in part of phenols, among them vanillin.

We have found that beans subjected to the usual curing processes respire rapidly for some time. This respiration leads to considerable oxidation that may lower the content of phenolic bodies, therefore of aroma bearing bodies, in the fruit. We have also found that the respiration of such beans is substantially lowered after they have been frozen, thereby reducing the initial amount of oxidation to occur, and eventually producing beans of a higher phenolic content.

Our process consists in subjecting the beans that are ready for curing to a temperature sufficiently low to freeze them solidly in not longer than three or four hours. The beans may then be kept for several days in a frozen condition without apparent change. The beans may be frozen, according to our process, either in air or other suitable gases, or submerged in water.

We continue our process by allowing the beans to thaw at room temperature. When they are thawed, the remaining processes of the usual curing program are undertaken at once.

After the curing has been completed by accepted methods, the beans that were first frozen are characterized by greater flexibility, a more desirable color and aroma, a softer and less woody feel throughout the bean, and especially at the stem end. The extracts from these beans are furthermore characterized by a higher content of total phenols than is found in similar beans cured without freezing.

Having thus described our invention, what we claim for Letters Patent is:

We claim:

1. A process for curing vanilla beans which comprises subjecting them to the action of a temperature that will cause the beans to freeze solidly; thereafter thawing the beans; thereafter completing the cure by known and usual methods.

2. A process for curing vanilla beans, which comprises subjecting vanilla beans for at least three hours to the action of a temperature that will cause the beans to freeze solidly; thence keeping the beans for several days in this condition; thence subjecting the beans to room temperature until thawed; and thence drying and aging.

ARNOLD K. BALLS.
ARTHUR G. KEVORKIAN.
FRANCISCA E. ARANA.